No. 748,858. PATENTED JAN. 5, 1904.
C. H. GRAY & T. SLOPER.
COVER FOR ELASTIC TIRES.
APPLICATION FILED OCT. 5, 1903.

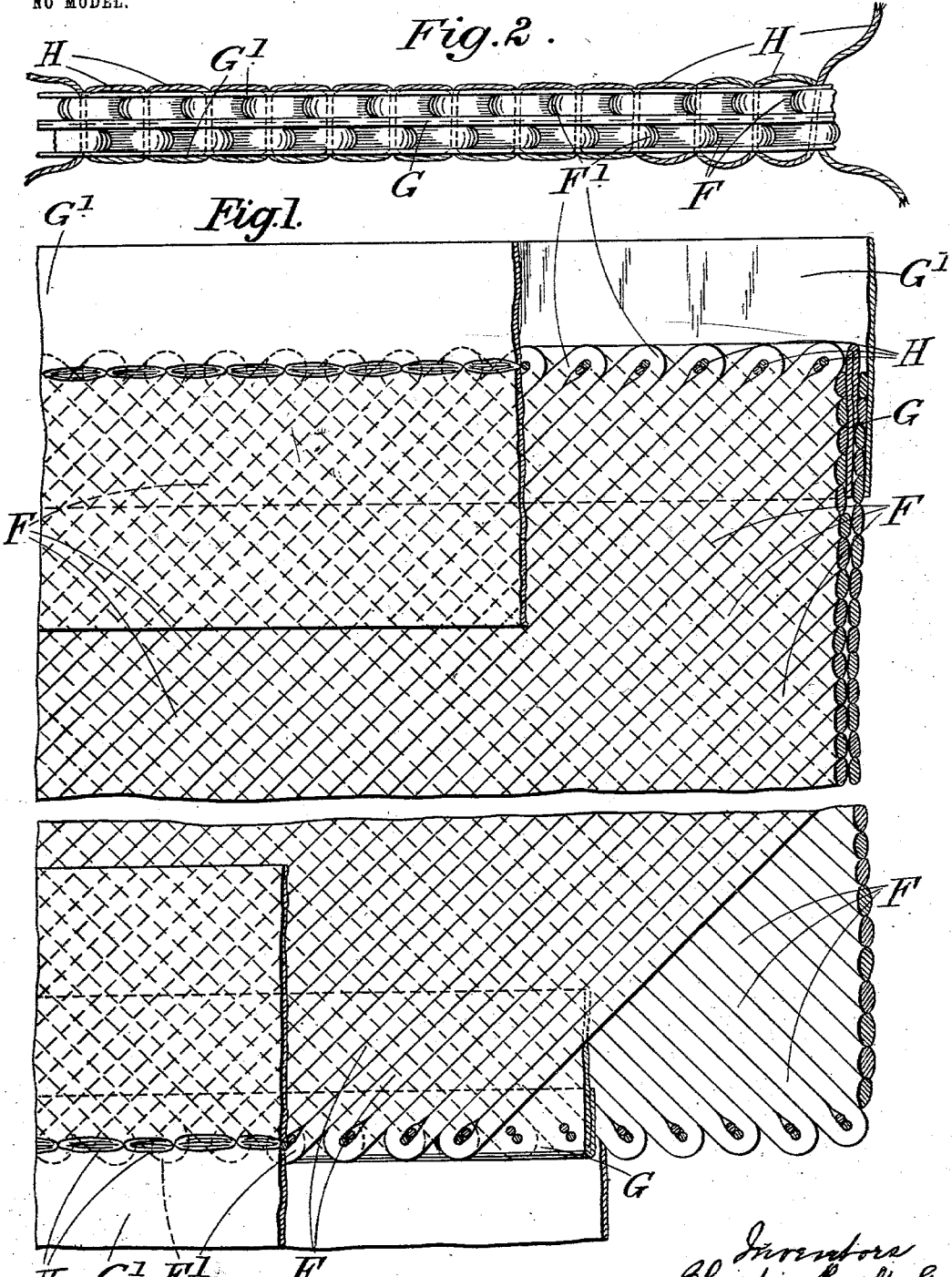

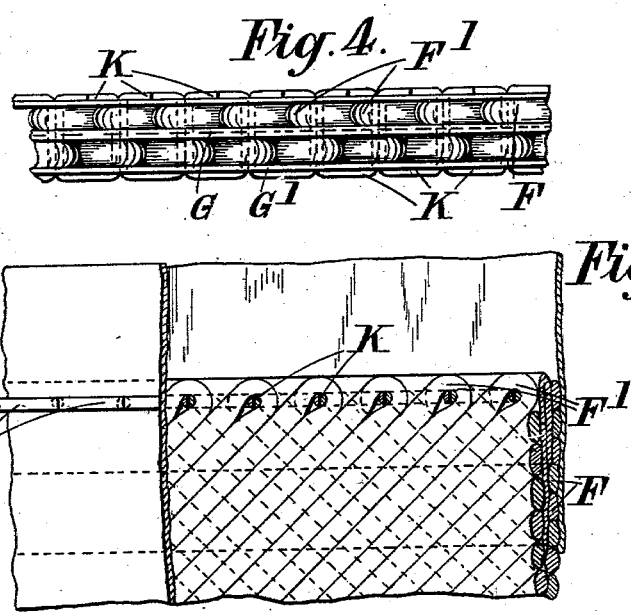
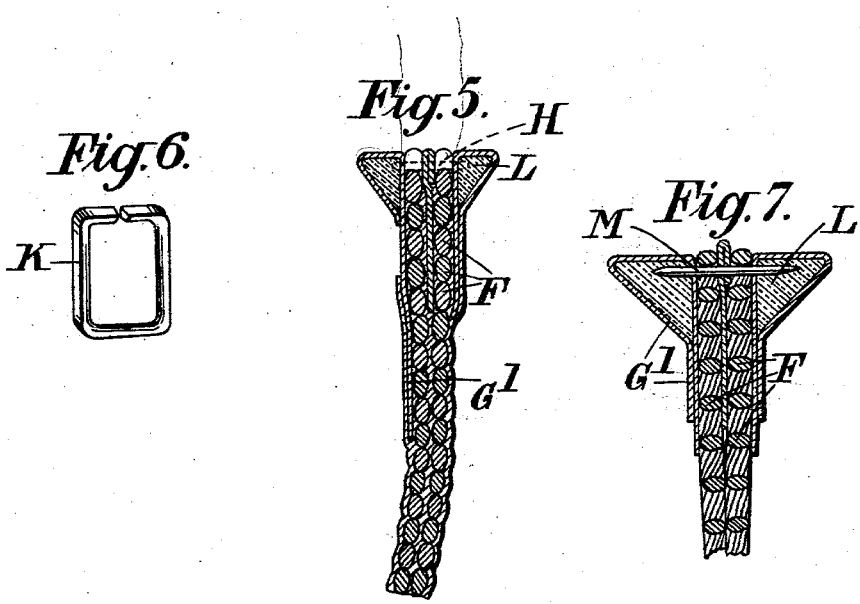

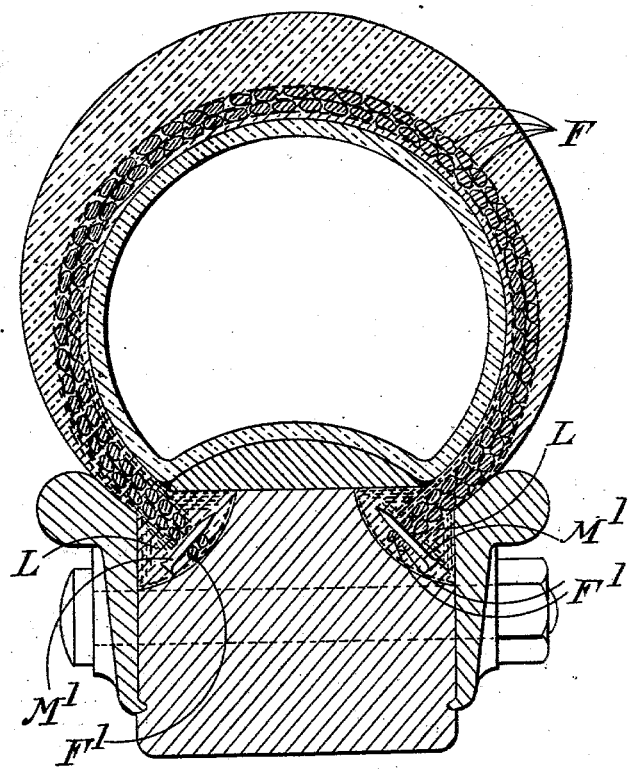

NO MODEL. 4 SHEETS—SHEET 4.

No. 748,858. Patented January 5, 1904.

UNITED STATES PATENT OFFICE.

CHRISTIAN HAMILTON GRAY, OF SILVERTOWN, AND THOMAS SLOPER, OF DEVIZES, ENGLAND.

COVER FOR ELASTIC TIRES.

SPECIFICATION forming part of Letters Patent No. 748,858, dated January 5, 1904.

Application filed October 5, 1903. Serial No. 175,882. (No model.)

*To all whom it may concern:*

Be it known that we, CHRISTIAN HAMILTON GRAY, residing at Silvertown, county of Essex, and THOMAS SLOPER, residing at Devizes, county of Wilts, England, subjects of the King of England, have invented certain new and useful Improvements in Covers for Elastic Tires, of which the following is a specification.

This invention relates to covers or shields for elastic tires, and is particularly applicable to pneumatic-tire covers, although not restricted to these.

The object of this invention is to provide a tire-cover constructed of a plurality of layers of parallel cords, which cords cross the tire from edge to edge, preferably obliquely, each cord at the edge of the tire having a loop by which it may be anchored to a corresponding cord in the next layer. Further, a bead may be secured on one or both sides at each edge of the tire, and the cords in addition to being anchored together by their loops may also be secured in the same manner to the bead or beads. A bead is preferably used on each side of each edge, so that the fabric of the cover is held securely between the two beads, and a straight pull is thus obtained upon the bead, rendering the connection much more secure than is the case when one bead is provided on one side only, although in an alternative form hereinafter described a single bead may be employed. The cords and beads are all embedded in rubber in the usual manner, any desired thickness of which may be applied according to requirements.

Figure 9:
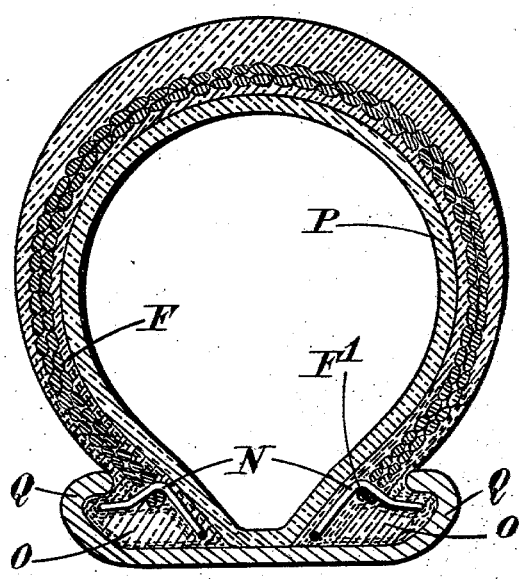
Figure 10:

In the accompanying drawings, Figure 1 is a plan of a portion of tire-cover constructed according to this invention, but with the rubber omitted for the sake of clearness. Fig. 2 is an edge view of Fig. 1. Fig. 3 is a similar view to Fig. 1, illustrating a modification. Fig. 4 is an edge view of Fig. 3. Fig. 5 is a transverse section of Fig. 3. Fig. 6 is a detail. Fig. 7 is a view similar to Fig. 5, showing a modification. Fig. 8 is a transverse section of a complete tire constructed according to this invention in place upon the wheel-rim, and Fig. 9 is a similar view of a modified construction of tire.

Like letters indicate like parts throughout the drawings.

The portion of tire-cover shown in Fig. 1 is composed of two layers of parallel cords, each layer being built up of a single cord carried obliquely from edge to edge of the cover and turned back at each edge upon itself, so that loops F' are formed at the edges. The cords of the second layer also cross the cover obliquely and conveniently at right angles to those of the first layer. This layer is similarly built up of a cord doubled back upon itself, so that loops registering with those of the other layer are formed at the edges of the cover.

Between the two layers of cords and at those portions occupied by the loops a strip of canvas G is inserted, one at each edge. Strips of canvas G' are also secured on both faces of the cover and extend beyond the same, to be finally wrapped round a bead, as hereinafter described. The cords F are rubbered in any well-known manner and are fastened to each other and to the canvas portions G G' by means of rubber; but to further secure the whole together threads H are sewed through opposed loops F' of the two layers, so that the loops of one layer are fastened to those of the next and also the loops of each layer connected to each other. Two threads H are conveniently used to fasten the cords F together, each thread being passed through each pair of superimposed loops from opposite sides of the fabric and carried on to the next pair of loops, through which they are passed in the same manner, as clearly shown in Fig. 2. The threads H of course pass through the canvas strips G G', as well as the loops F', so that these strips are firmly secured in place, and the whole forms a secure anchorage for the individual cords. After the cords have thus been connected together a bead, such as L, Fig. 5, composed of any convenient material, is secured at each edge of the cover, each bead being placed on that side intended to form the outside of the cover or one on each face at each edge forming a double bead, as shown in Fig. 5, as desired. That part of the canvas G' which projects beyond the edge of the cover is then wrapped over the bead, as shown in Fig. 5, and secured in place by rubber in the well-known manner. The fabric is then covered with the required amount of rubber and vulcanized together, so that it forms one mass.

Figs. 3 and 4 show a fabric built up in the same manner as that already described; but the cords F are fastened together with staples K in place of the threads H. The limbs of each staple pass through adjacent loops, and each loop receives two limbs of adjacent staples, so that the whole of the cords are connected together as one piece of fabric by this means. The limbs of the staples are flat on their outer faces, as shown clearly in Fig. 6, but rounded on their inner faces, which are toward the cords F when in place. This flattening of the outer faces allows the limbs of adjacent staples to lie closer together than would be the case if they were rounded in the usual manner.

The beads L may be secured on one or both faces at each edge of the cover constructed in this manner, as already described with reference to the construction of cover shown in Figs. 1 and 2 and as shown in Fig. 5.

In place of the staples K pins M may be employed to secure the ends of the cords F, and the pins may be allowed to project on both sides of the cover, so that they enter the beads L, as shown in Fig. 7. This constitutes a secure form of anchoring by which the beads are readily secured to the fabric, as well as the cords of the fabric secured together, and is more easily carried out than the stitching referred to above, although this latter may be carried through the beads, if desired.

Figure 8 shows a transverse section of a tire constructed as last described, except that the pins M' are shown in the form of brads in place of the double-pointed pins shown in Fig. 7.

Obviously the pins by which the cords F are anchored and which are allowed to project into the bead may be doubled—that is to say, a staple may be employed instead of two brads or pins. Such an arrangement is shown in Fig. 9, in which a single bead is provided at each edge on the outer face of the cover. A double pin or staple N is employed in this case to anchor the cords, and the free ends of the limbs are passed through the loops of the cords, as described with reference to the staples K, but project beyond the cords approximately at right angles to the fabric and enter the single bead shown at O. The connected ends of the limbs of the staple are bent back into a plane approximately parallel with that of the cords and extend beyond the edge proper of the tire fabric—that is, the edge formed at the ends of the loops F'. The bead O also extends beyond the ends of the loops F', and the extending portion of the staples or double pins N lie upon the inner face of the bead. This construction in addition to the advantage of the anchorage obtained has the further advantage that the extending portions of the staples N receive the pressure of the inner tube P when the latter is inflated, so that the tire is held securely in place in the rim of the wheel, (indicated at Q.)

It is preferred to arrange the cords so that the loops of one layer register with those of the other, as described above; but this is not essential, as the loops of one layer may come opposite the spaces between those of the other in some cases, although this arrangement will obviously necessitate double the number of fastenings to anchor them to the bead or beads.

It will be understood that while two layers only of cords have been described as employed in building up the cover more layers may be used, if desired.

Although this cover is preferably employed for a pneumatic tire, it may, if desired, form a shield or cover for a solid tire, the space commonly filled with the air-tube being filled with a solid mass of rubber or suitable composition detached from or secured to the cover or shield.

It will be clearly seen that the object of the fastening devices, whatever form these may take, is to secure the loops of the cords to the edging of the tire—that is, either the canvas strengthening strips G G' or the beads L, or both, as the case may be.

What we claim as our invention, and desire to secure by Letters Patent, is—

1. In a cover for an elastic tire, the combination of a plurality of superimposed layers of cords laid side by side and embedded in rubber, the cords crossing the cover from one edge toward the other and having at the edges of the cover fastening-loops and fastening devices inserted in the loops to connect them together, substantially as set forth.

2. In a cover for an elastic tire, the combination of a plurality of superimposed layers of cords laid side by side and embedded in rubber, each cord of each layer crossing the cover from edge to edge and having at each edge of the cover a fastening-loop and a fastening device inserted in the loops to connect them together, substantially as set forth.

3. In a cover for an elastic tire, the combination of a plurality of superimposed layers of cord laid side by side and embedded in rubber, the cords crossing the cover from one edge toward the other and having at the edges of the cover fastening-loops, an edging to the tire and a series of pins inserted in the loops and edging to connect them together, substantially as set forth.

4. In a cover for an elastic tire, the combination of, a plurality of superimposed layers of cords laid side by side and embedded in rubber, the cords crossing the cover from one edge toward the other and having at the edges of the cover fastening-loops and a series of double pins or staples to connect the loops together, substantially as set forth.

5. In a cover for an elastic tire, the combination of, a plurality of superimposed layers of cords laid side by side and embedded in rubber, the cords crossing the cover from one edge toward the other and having at the edges of the cover fastening-loops and a double pin, each limb of which engages a loop in different layers to connect the loops of one layer to the other and hold different loops of the same layer together, all the loops of each layer being thus connected substantially as set forth.

6. In a cover for an elastic tire the combination of, a plurality of superimposed layers of cords laid side by side and embedded in rubber, the cords crossing the cover from one edge toward the other and having at the edges of the cover fastening-loops the loops of one layer registering with those of another and a fastening device inserted in superimposed loops to connect them together, substantially as set forth.

7. In a cover for an elastic tire the combination of, a plurality of superimposed layers of cords laid side by side embedded in rubber the cords crossing the cover from one edge toward the other and having at the edges of the cover fastening-loops, the loops of one layer registering with those of another and a pin inserted in superimposed loops to connect them together, substantially as set forth.

8. In a cover for an elastic tire the combination of, a plurality of superimposed layers of cords laid side by side and embedded in rubber, the cords crossing the cover from one edge toward the other and having at the edges of the cover fastening-loops, the loops of one layer registering with those of another and a double pin or staple one limb of which is inserted in one set of superimposed loops and the other limb in another set to connect the loops of one layer to the other and hold different loops of the same layer together, substantially as set forth.

9. In a cover for an elastic tire the combination of, a plurality of superimposed layers of cords laid side by side and embedded in rubber, the cords crossing the cover from one edge toward the other and having at the edges of the cover fastening-loops, the loops of one layer registering with those of another and a double pin or staple one limb of which is inserted in one set of superimposed loops and the other limb in another set to connect the loops of one layer to the other and hold different loops of the same layer together, all the loops of each layer being thus connected, substantially as set forth.

10. In a cover for an elastic tire, the combination of, a plurality of superimposed layers of cords laid side by side and embedded in rubber, the cords crossing the cover from one edge toward the other and having at the edges of the cover fastening-loops, an edging to the tire and a pin inserted in each loop, the pins projecting through the loops approximately at right angles thereto and connecting them with the edging substantially as set forth.

11. In a cover for an elastic tire, the combination of, a plurality of superimposed layers of cords laid side by side and embedded in rubber, the cords crossing the cover from one edge toward the other and having at the edges of the cover fastening-loops, an edging to the tire and a pin inserted in each loop one end of the pin projecting through the loop approximately at right angles thereto and the other end extending beyond the edge of the fabric formed by the cords and lying in a plane approximately parallel with that of the cords, substantially as set forth.

12. In a cover for an elastic tire, the combination of, a plurality of superimposed layers of cords laid side by side and embedded in rubber, the cords crossing the cover from one edge toward the other and having at the edges of the cover fastening-loops, a double pin or staple, each limb of which engages a loop while adjacent ends of the limbs project on the outer side of the fabric formed by the cords approximately at right angles thereto, and the other adjacent ends of both limbs extend beyond the edge of the fabric formed by the cords and lie in a plane approximately parallel to that of the cords, substantially as set forth.

13. In a cover for an elastic tire, the combination of, a plurality of superimposed layers of cords laid side by side embedded in rubber, the cords crossing the cover from one edge toward the other and having at the edges of the cover fastening-loops, a bead at each edge of the cover extending beyond the loops, a double pin or staple each limb of which engages the loop while adjacent ends of the limbs project on the outside of the fabric formed by the cords approximately at right angles thereto, and enter the bead, and the other adjacent ends of both limbs extend beyond the edge of the fabric formed by the cords and lie in a plane approximately parallel to that of the cords and also enter the bead, substantially as set forth.

14. In a cover for an elastic tire, the combination of a plurality of superimposed layers of cords laid side by side and embedded in rubber, the cords of each layer crossing the cover from one edge toward the other and having at the edges of the cover fastening-loops, a fastening device inserted in the loops to connect them together, and a bead one on one side of each edge of the cover, substantially as set forth.

15. In a cover for an elastic tire, the combination of a plurality of superimposed layers of cords laid side by side and embedded in rubber, the cords crossing the cover from one edge toward the other and having at the edges of the cover fastening-loops, a bead one on one side of each edge of the cover and a fastening device inserted in the bead and loops to connect them and the bead together, substantially as set forth.

16. In a cover for an elastic tire, the combination of a plurality of superimposed layers of cords laid side by side and embedded in rubber, the cords crossing the cover from one edge toward the other and having at the edges of the cover fastening-loops, a bead one on one side of each edge of the cover, and a series of pins inserted in the bead and loops to connect them and the bead together, substantially as set forth.

17. In a cover for an elastic tire, the combination of a plurality of superimposed layers of cords laid side by side and embedded in rubber, the cords of each layer crossing the cover from one edge toward the other and having at the edges of the cover fastening-loops, a bead on the outer side of each edge of the cover and a series of pins inserted in the loops one end of each pin projecting approximately at right angles from the cover into the bead to connect the bead and loops together, substantially as set forth.

18. In a cover for an elastic tire, the combination of a plurality of superimposed layers of cords laid side by side and embedded in rubber, the cords of each layer crossing the cover from one edge toward the other and having at the edges of the cover fastening-loops, a bead, one on the outer side of each edge of the cover, and a series of pins inserted in the loops to connect them together, one end of each pin projecting approximately at right angles from the cover into the bead to connect the bead and loops together and the other end extending beyond the edge of the fabric formed by the cords and lying in a plane approximately parallel to that of the cords, substantially as set forth.

19. In a cover for an elastic tire, the combination of a plurality of superimposed layers of cords laid side by side and embedded in rubber, the cords crossing the cover from one edge toward the other and having at the edges of the cover fastening-loops, a fastening device inserted in the loops to connect them together and a bead on each side of each edge of the cover, substantially as set forth.

20. In a cover for an elastic tire, the combination of a plurality of superimposed layers of cords laid side by side and embedded in rubber the cords crossing the cover from one edge toward the other and having at the edges of the cover fastening-loops, the loops of one layer registering with those of the next, a bead on each side of each edge of the cover, and a fastening device inserted in the beads and loops to connect them and the beads of the same edge together, substantially as set forth.

21. In a cover for an elastic tire the combination of a plurality of superimposed layers of parallel cords embedded in rubber, the cords crossing the cover from one edge toward the other and having at the edges of the cover fastening-loops, a bead on each side of each edge, and a pin inserted in the beads and loops to connect them and the beads of the same edge together, substantially as set forth.

22. In a cover for an elastic tire, the combination of a plurality of superimposed layers of cords laid side by side and embedded in rubber, the cords crossing the cover from one edge toward the other and being bent back at the edge of the cover to form a fastening-loop, an edging to the cover, and a fastening device to connect the loops and edging together, substantially as set forth.

23. In a cover for an elastic tire, the combination of a plurality of superimposed layers of cords laid side by side and embedded in rubber, the cords crossing the cover from one edge toward the other and forming parts of a single cord doubled back upon itself to form fastening-loops at the edges of the cover, an edging to the cover and a fastening device to connect the loops and edging together, substantially as set forth.

24. In a cover for an elastic tire, the combination of a plurality of superimposed layers of cords laid side by side and embedded in rubber, the cords crossing the cover from one edge toward the other and having at the edges of the cover fastening-loops, a strengthening-strip at each edge of the cover between one layer of loops and the next, and a fastening device inserted in the loops and through the strengthening-strip to connect the loops and strip together, substantially as set forth.

25. In a cover for an elastic tire the combination of a plurality of superimposed layers of cords laid side by side and embedded in rubber, the cords crossing the cover from one edge toward the other and having at the edges of the cover fastening devices a strengthening-strip at each edge of the cover between one layer of loops and the next, a strengthening-strip one on each side of each edge of the cover, and a fastening device inserted in the loops and passed through the strengthening-strips to connect them and the loops together, substantially as set forth.

In testimony whereof we have signed our names to this specification in the presence of two subscribing witnesses.

CHRISTIAN HAMILTON GRAY.
THOMAS SLOPER.

Witnesses to the signature of Christian Hamilton Gray:
T. J. OSMAN,
W. J. NORWOOD.

Witnesses to signature of Thomas Sloper:
A. M. HAYWARD,
W. H. BALLANTYNE.